Figure 1:
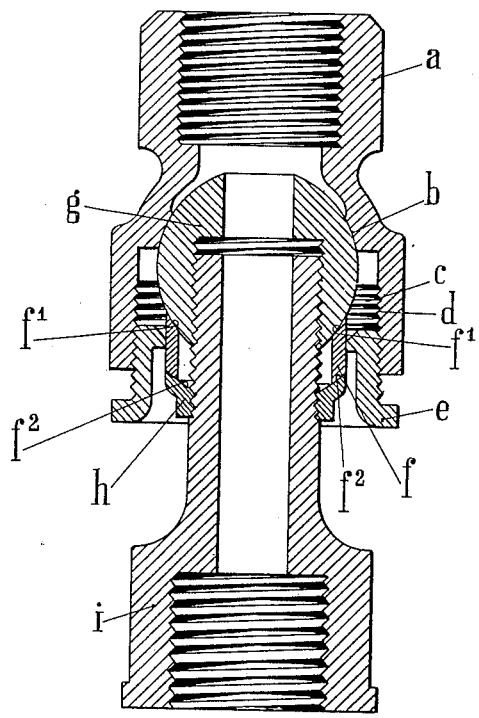

No. 888,288. PATENTED MAY 19, 1908.
J. H. WINDEMULLER.
BALL AND SOCKET JOINT FOR PIPE CONNECTIONS.
APPLICATION FILED OCT. 22, 1906.

2 SHEETS—SHEET 1.

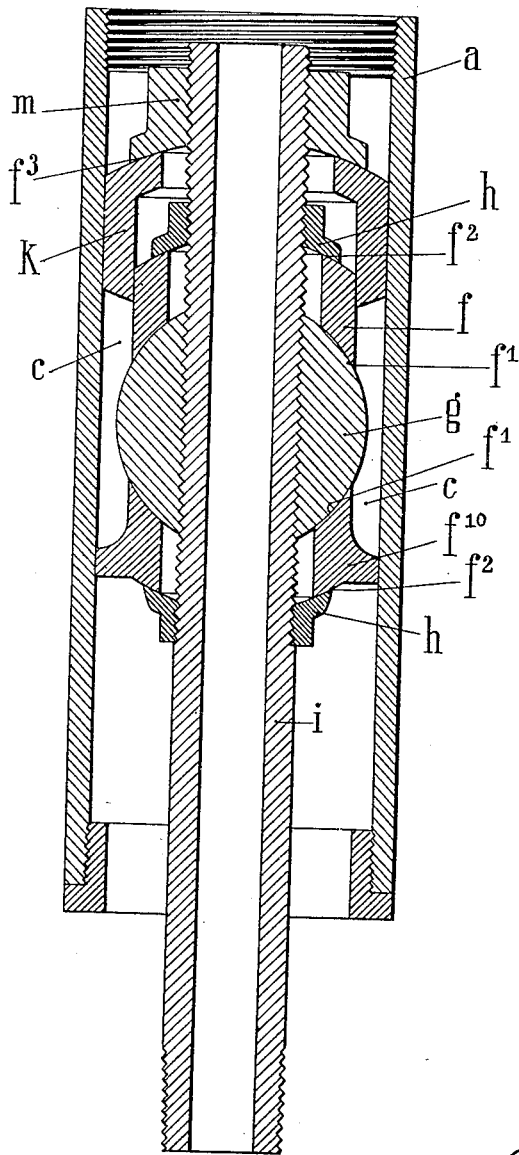

UNITED STATES PATENT OFFICE.

JAN HENDRIK WINDEMULLER, OF ROTTERDAM, NETHERLANDS.

BALL-AND-SOCKET JOINT FOR PIPE CONNECTIONS.

No. 888,288.   Specification of Letters Patent.   Patented May 19, 1908.

Application filed October 22, 1906. Serial No. 340,046.

*To all whom it may concern:*

Be it known that I, JAN HENDRIK WINDEMULLER, a subject of the Queen of the Netherlands, residing at Boompjes 52, in the city of Rotterdam, Netherlands, have invented certain new and useful Improvements in Ball-and-Socket Joints for Pipe Connections and the Like; and I do hereby declare the following to be a full, clear, and exact description of the invention, such as will enable others skilled in the art to which it appertains to make and use the same.

This invention relates to a ball and socket joint for pipe connections and especially to joints of this type in which the packing can be tightened up like that of a stuffing box.

Such ball and socket joints as heretofore usually constructed have in some cases, a very small limit of adjustability owing to the fact that the annular nut which presses the packing bears directly upon the surface of the ball; while in other known ball and socket joints in which the packing can be adjusted to a sufficient extent, the packing space is not sufficient for good packing, such ball and socket joints are not suitable for vertically hanging pipes, such for example as are used for chandeliers.

A main object of the present invention is to provide in the ball and socket joint a space in which the packing material can be pressed together in wide limits and towards all sides by a stuffing box gland guided in a straight line. This end is substantially attained by the fact that in the stuffing box ring of the improved joint there is firmly held a concentric ring which is pressed on the one hand against the ball and on the other hand against a ball surface, which is connected to the length of pipe carrying the ball. This arrangement also enables the whole ball and socket joint, provided a double stuffing box is provided, to be moved in a pipe so that not only a side way movement but a movement in a longitudinal direction can also be obtained.

In the accompanying illustrative drawings Figure 1 shows in centrally longitudinal section a ball and socket joint of the improved form. Fig. 2 shows the adaptation of the improved ball and socket joint to pipes capable of being moved telescopically or endwise in each other.

In all the figures corresponding parts are numbered with corresponding letters.

In the examples the ball and socket joint illustrated comprises a carrier of a gasolier or the like.

In the form of construction shown in Fig. 1 $a$ is a stationary part of the joint which is formed with a chamber $c$ suitable for the reception of the ball $g$ and which is turned at $b$ to fit the periphery of the ball. The chamber $c$ is adapted to receive packing material such as asbestos wool or the like and is formed with an internal screw-thread $d$ into which the annular part or nut $e$ can be screwed. The internal hole in the annular nut $e$ fits exactly over a ring $f$, the upper edge of which is turned at $f^1$ so as to fit the ball $g$; at its lower edge the ring is formed with a surface $f^2$ concentric to the spherical surface of the ball $g$ and which surface $f^2$ bears against the correspondingly turned surface of a ring $h$. This ring $h$ is screwed on to the screw threaded portion of the movable pipe $i$. The ball $g$ is also screwed on the same screw threaded portion.

It will be readily seen that the parts $a$, $e$ and $f$ are stationary, while the parts $g$, $h$ and $i$ are free to rotate and oscillate together with the gasolier fastened to them. It is furthermore obvious that packing material in the chamber $c$ is pressed out uniformly on all sides by tightening up the annular nut $e$ and that therefore a tight joint between the movable parts and the stationary parts is insured.

In the construction shown in Fig. 2 it will be seen from the drawing that the pipe $i$ carries the ball $g$ against which above there bears a ring $f$, and against which from below there bears an adjustable part or nut $f^{10}$ guided in a stationary pipe $a$ so that it cannot move laterally but can be pressed up and down together with the pipe $i$. The upper ring $f$ is held by an intermediate adjustable part or nut $k$ which is itself capable of adjustment endwise in the tube $a$. The ring $f$ and nut $f^{10}$ are formed with surfaces $f^2$ concentric to the ball $g$ against which surfaces bear the rings $h$ screwed on to the pipe $i$. The rings $h$ are also formed with spherical surfaces struck from the center of the ball $g$. The chamber $c$ is filled with packing material which can be compressed to the desired extent by the ring $k$. The best way of tightening up the ring $k$ is by a nut $m$ that is screwed on the pipe $i$ and is formed as $f^3$ with a spherical surface also struck from the center of the ball $g$. It is obvious that in this way the pipe $i$ and consequently the entire ball and socket can be moved endwise in the pipe $a$ and turned and swung relatively to a, the joint being made in all directions by the packing material in the chamber c.

Having now particularly described and ascertained the nature of the said invention and in what manner the same is to be performed, I declare that what I claim is:—

1. A ball and socket joint comprising two main parts having a chamber containing a packing material associated therewith, one of said main parts carrying a ball bearing surface, and the other main part carrying a part contacting with said packing material and adjustable relatively to said last mentioned main part, and a ring contacting with said adjustable part and bearing against said ball bearing surface whereby when said adjustable part is moved in the proper direction, the packing material is compressed, but the said ring is not acted upon, substantially as described.

2. A ball and socket joint for pipes, comprising two parts, providing a chamber between them adapted to contain a packing material, one carrying a ball and the other part carrying a means adjustable relatively to said other part, a ring adjustably fixed in said means and bearing against said wall, and a second ring adjustably connected with the part carrying the ball and adapted to adjust the said first ring and hold the same against the said ball, whereby when the said part is adjusted the said rings are acted upon, substantially as described.

3. In a ball and socket joint for pipes, the combination of a fixed part provided with an adjustable part adjustable in said fixed part, and a ring adjustably seated in said fixed part, a movable part provided with a ball fixed thereto, a second ring secured in said fixed part and contacting with said first ring, the contacting faces of each of said rings being concentric with the surface of said ball, and the said fixed and movable parts providing between them a space adapted to receive a packing, means whereby the said adjustable part may be adjusted to compress the said packing means without acting upon the said rings and the said movable part may be moved at will, substantially as described.

4. In a ball and socket joint for pipes, the combination of a movable part $i$, provided with a ball $g$, and a pair of rings $h$, adjustably secured to said part $i$, and a fixed part $a$, provided with a part $k$ adjustable in said fixed part, a third ring $f$ adjustably secured in said part $k$, and contacting at one end with one of said first mentioned rings on said movable part $i$, and at its other end with said ball, and a second part, $f^{10}$, also, adjustably secured to said fixed part and contacting at one end with the other of said first mentioned rings and at its other end with said ball, substantially as described.

5. In a ball and socket joint for pipes, the combination of a movable part $i$, a ball $g$, fixed on said part, rings $h$, $h$ adjustable on said part, a fixed part $a$, parts $k$ and $f$ adjustable relatively to said part $a$, a ring adjustable in one of said parts, each of said rings being provided with contacting surfaces concentric to the surface of said ball, and said parts $a$ and $i$ forming a chamber between them adapted to receive packing material, substantially as described.

6. In a ball and socket joint, the combination of a movable part $i$ provided with a ball $g$ and a ring adjustable on said part, and a stationary part $a$, having a part $k$ adjustable therein, a ring $f$ adjustably secured in said part $k$ and bearing at one end against said ball and at its other against said first mentioned ring, a suitable space adapted to receive packing material being provided between the parts, $a$ and $i$ substantially as described.

In testimony whereof, I have affixed my signature, in presence of two witnesses.

JAN HENDRIK WINDEMULLER.

Witnesses:
　AUGUST F. W. HAACK,
　CORNELIS A. VAN DEN EELAART.